July 5, 1955 A. NYMAN 2,712,611
OPTICAL SCANNING HEAD FOR FACSIMILE TRANSMITTER
Filed Jan. 12, 1951
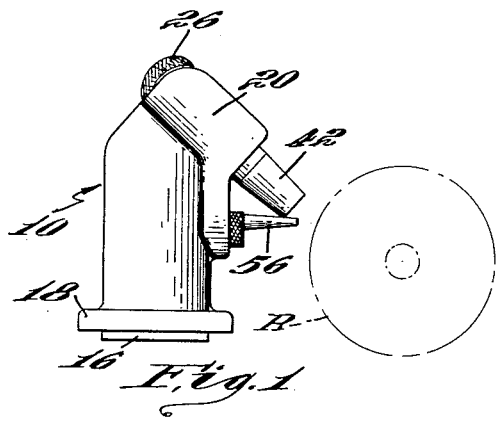
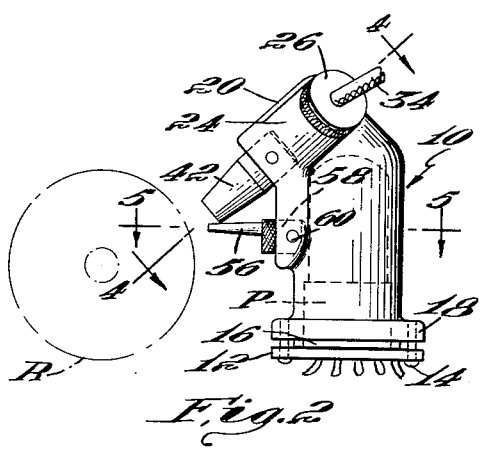
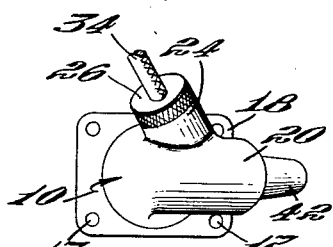
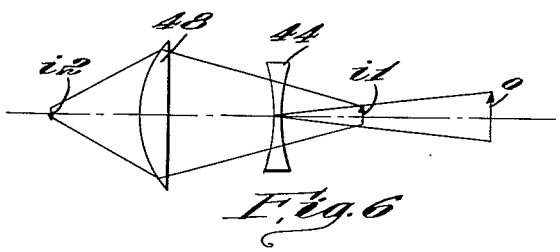
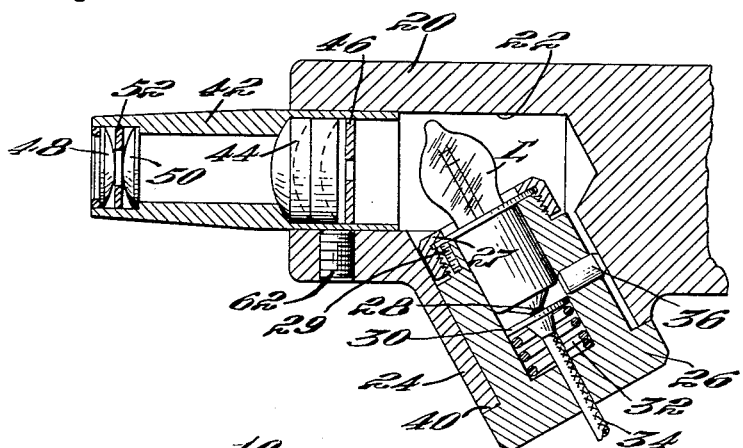
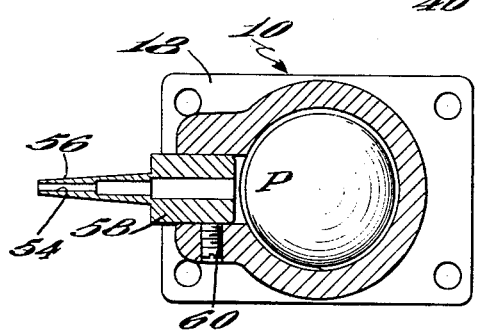
Inventor
Alexander Nyman
by Roberts, Cushman & Grover
Att'ys.

United States Patent Office 2,712,611
Patented July 5, 1955

2,712,611

OPTICAL SCANNING HEAD FOR FACSIMILE TRANSMITTER

Alexander Nyman, Dover, Mass., assignor to Alden Products Co., Brockton, Mass., a corporation of Massachusetts Application January 12, 1951, Serial No. 205,731

1 Claim. (Cl. 250—219)

In the optical scanning of the copy carried upon the drum of a facsimile transmitter the scanned copy is commonly illuminated by means of either a flood projection system or a spot projection system. In the flood projection system a relatively large area of the copy is illuminated brightly by a light source. An instantaneously scanned elemental area small enough to give the desired definition, is selected from the illuminated area and imaged upon the sensitized electrode of a photoelectrical cell by means of an optical system. This system operates satisfactorily, but requires a large lamp as the illuminating source and an expensive direct current or high frequency auxiliary power supply to energize the lamp so that the illumination does not vary due to A. C. ripple. In the spot projection system only the region of the actual scanned area is illuminated by means of light from an optical system interposed between the light source and the copy. Theoretically the latter system reduces the amount of light required but as a practical matter dimensions of the scanned area are in the neighborhood of 0.01 to 0.015 inch which is several times smaller than the projected area of the filament of any commercially available lamp, making it necessary to introduce an aperture into the optical system so that only a comparatively small amount of the available light is used.

It is accordingly the principal object of the present invention to provide apparatus which will reduce the illumination required for scanning to a minimum. Further objects are to provide scanning apparatus which is small in size, which is simple to adjust, which incorporates commercially available components, which reduces the power required to a minimum, which can be used with present facsimile transmitters, which is rugged in construction, which is economical to manufacture and which advances the art generally.

In a broad aspect the invention contemplates an optical scanner for the copy carrying drum of a facsimile transmitter or similar device which comprises a source of light such as an electric lamp secured within a housing or other enclosure and an optical system which is attached to the housing or otherwise arranged to image upon a selected area of the copy the filament or other emitting portion of the light source. This optical system is preferably of the minifying type in which the image of the source upon the copy is substantially smaller than the source itself. A light sensitive device such as a photoelectric cell responsive to variations in light intensity is mounted upon the housing. Means are provided for shielding the device so that substantially no light other than that reflected from the copy impinges upon the device.

In a further aspect the minifying optical system includes both diverging and converging lens means mounted, preferably at opposite ends of a barrel which telescopes with a portion of the housing so that one or more lenses having an overall divergent characteristic are positioned adjacent the light source and one or more lenses having an overall converging characteristic are positioned adjacent a selected area of the copy carried upon the transmitter drum. The curvatures, refractive indices and distances between the lenses of opposite characteristics are such that the light source is imaged upon the copy at a distance which is less than the distance between the lens means.

In a more specific aspect the housing is recessed at one end to receive the photoelectric cell. A hollow boss into which the barrel carrying the lens telescopes is formed integrally with the opposite end of the housing. The axes of the barrel and housing are disposed at an acute angle so that the end of the barrel carrying the converging portion of the lens system is positioned adjacent the selected area of the copy upon the drum. A tubular member having an axial aperture therein extends from the wall of the housing normally to its axis, the extended ends of the barrel and tube being adjacent, so that only light reflected from the copy impinges upon the cell.

These and other objects and aspects will be apparent from the following description of an illustrative specific embodiment of the invention referring to a drawing in which Fig. 1 is an elevation view of one side of the scanner;

Fig. 2 is an elevation view of the side opposed to that shown in Fig. 1;

Fig. 3 is a plan view;

Fig. 4 is an enlarged partial sectional view on line 4—4 of Fig. 2;

Fig. 5 is an enlarged sectional view on line 5—5 of Fig. 2; and

Fig. 6 is a schematic view of the optical system incorporated in the scanner.

The scanner illustrated in Figs. 1 and 2 comprises a generally cylindrical, hollow housing 10 having an open lower end and proportioned so that a device responsive to variation of incident light such as the conventional photoelectric cell P can be inserted therein. The cell P is carried in a socket 12 which is either secured to the bottom of the housing 10 by means of the screws 14 or is fastened to the supporting chassis for the scanner (not shown). In the latter case the relative position of the housing 10 and the cell P is determined by a circular protruding portion 16 which engages a rabbet in the chassis. The scanner is secured to the chassis by means of four cap screws (not shown) which project through corresponding apertures 17 (Fig. 3) in a flange 18 which extends laterally from the lower end of the housing 10.

Cast integrally with the upper end of the housing 10 is a cylindrical boss 20, the axes of the housing and boss being angularly disposed so that the axis of the boss passes through the selected scanning spot upon the drum R of the associated facsimile transmitter when the scanner is mounted upon the chassis as described heretofore. The boss 20 is provided with an axial recess 22 (Fig. 4) which does not interconnect with the recess in the housing 10 wherein is located the photoelectric cell P being separated therefrom by the wall of the boss. An auxiliary boss 24 cast in the side wall of the boss 20 has an axially disposed passageway which communicates with the recess 22 in the boss 20 so that a light source such as the small prefocused incandescent lamp L can be secured therein as will be described in detail below.

To facilitate replacing of the lamp L, the lamp is mounted upon a removable plug 26 (Fig. 4) which fits into the passageway in the auxiliary boss 24. The base of the lamp L extends into a socket formed by recessing the plug 26 and is held therein by means of a ferrule 27 which upon engaging external threads upon the inwardly projecting end of the plug bears against the top of a flange extending radially from the lamp base. The position of the prefocused lamp filament with respect to the plug 26 is determined by a dowel 29 threaded into the end of the plug so that the extending dowel end fits into a recess in the lamp flange. Electrical connection to the center contact of the lamp L is made through a corresponding contact 28 which is carried by a wafer 30 of insulating material inserted in the socket recess below the lamp base. The wafer 30 is biased to bring the contact carried thereon into forcible engagement with the corresponding contact of the lamp L by means of a spring 32 which is interposed between the wafer and the bottom of the socket recess in the plug 26.

The contact 28 carried by the wafer 30 is connected electrically with the power source (not shown) for energizing the lamp L by means of a flexible insulated conductor 34, the energizing circuit being completed through ground. To this end a pin 36 extends through the wall of the plug 26 so that its inner end contacts the lamp base. The outer end of the pin 36 contacts the wall of the passageway in the auxiliary boss 24, the pin being long enough so that the plug assembly fits snugly in the passageway. The outer end of the plug 26 is knurled and provided with a shoulder 40 which bears against the end of the boss 24 thus limiting the depth to which the plug can be inserted in the passageway to insure that the lamp filament is always in the same location.

Telescoping into the recess 22 in the housing boss 20 is a lens barrel 42 which carries a minifying optical system for imaging the filament of the lamp L upon the copy carried by the drum R. The optical system comprises a concave lens 44 mounted near the end of the barrel 42 adjacent the lamp L. An aperture plate 46 is interposed between the lens 44 and the lamp L to limit the effective portion of the lens. Two convex lenses 48 and 50 having a second aperture plate 52 interposed therebetween are mounted in the opposite end of the barrel 42 so that they are positioned adjacent the drum R.

The above optical system is shown schematically in Fig. 6 wherein the object designated *o* represents the filament of the lamp L. The diverging characteristic of the lens 44 forms a virtual upright image *i1* which is diminished, for example, to one third the size of the object *o*. The converging lens system including the lenses 48 and 50, is positioned so that the image *i1* is projected upon the copy carried by the drum R as a real inverted image *i2* which is diminished, for example, to one half in size so that the size of the final image *i2* is one sixth the size of the object *o*, thus concentrating the image of the filament in a minute spot of the order of 0.01 inch which defines the elemental, scanned or scanning area of the copy without the need of subsequent masking and also conserving the light from the lamp L.

The image *i2* of the lamp filament appears on the copy as a brilliant image of light whose boundaries define the elemental, scanning area of the copy, which boundaries are sharply outlined when the aperture plates 46 and 52 limit the rays through the lens to those not subject to aberration. Light from this spot is reflected upon the cathode of the photoelectric cell P through an axial aperture 54 (Fig. 5) in a tapering tubular member 56, which aperture acts to prevent substantially all light from falling on the cathode except that which is reflected from the scanning spot. The member 56 has an enlarged offset cylindrical portion 58 formed integrally with the tapering portion. The cylindrical portion 58 slidingly engages an aperture in the side wall of the housing 10, which aperture is positioned so that the axis of the aperture 54 projects normally from the axis of the housing 10 to intersect the axis of the lens barrel 42. The tubular member 56 is locked in position by means of a set screw 60, the end of which bears against the cylindrical portion 58.

The only adjustment of the optical system is the movement of the barrel 42 to focus the image upon the copy and to bring the optical axis and the axis of the aperture 54 of the tubular member into intersection. As the optical and mechanical axes of the barrel 42 do not exactly coincide even when it is most carefully manufactured, rotating of the barrel shifts the relative position of the optical axis. Advantage is taken of this condition, the barrel 42 being rotated until the optical axis is shifted to intersect the axis of the aperture 54. The barrel 42 is then moved in and out of the housing boss 24 until the image of the lamp filament is formed at the point of intersection of the axes. A set screw 62 (Fig. 4) locks the barrel in adjusted position. Once the adjustment has been made, it is possible to change one prefocused lamp L for another similar lamp without the necessity of readjusting the optical axis or the focus.

Because of the light concentrating action of the above-described optical system, only a small lamp L need be used which requires a minimum of power so that it can be readily operated from an alternating power source such as a multivibrator having a frequency high enough to eliminate the ripples from the light output of the lamp.

From the foregoing it will be understood that in one aspect the essence of the invention consists in focusing light on the copy in an elemental area small enough to define the scanning spot and exposing a light-sensitive device to said area of the copy, thereby affording the following advantages. In adjusting and operating the apparatus the size and location of the spot can be quickly and easily checked by direct observation instead of by interpretation of the resulting signals as heretofore. Furthermore the light-sensitive device need not be focused on the device as heretofore. And in another aspect the invention involves an optical minifying system interposed between the light source and copy to focus light from a source on the copy in an elemental area small enough to define the scanning spot, together with means responsive to light from the spot for transmitting signals produced by scanning the copy with the spot, this means including a light-sensitive device exposed to the copy at said area.

It should be understood that the present disclosure is for the purpose of illustration only and that is invention includes all modifications and equivalents which fall within the scope of the appended claim.

I claim:

For continuously scanning copy in facsimile transmission and the like a scanner comprising an exposed drum for carrying the copy on the outside thereof, a housing outside said drum, a source of light in the housing, an optical minifying system interposed between the light source and copy to focus light from the source on the copy in a scanning spot of the order of 0.01 to 0.015 inch to define an elemental scanning area, said minifying system including a diverging lens adjacent the light source and a converging lens adjacent the drum, and means responsive to light from said spot for transmitting signals produced by scanning the copy with said spot, said means including a light-sensitive device and a tubular member on the housing extending from said device toward said spot, said member having an unobstructed, non-refractive passageway large enough to permit the passage of light from said area of the copy, and said member being spaced from said drum to permit observation of said spot on said copy while preventing substantial reflection of light from the copy to the device except from said area, whereby the size and location of the scanning spot may be adjusted on the copy visually by direct observation and whereby said passageway prevents substantially all light from falling on said devices except that which is reflected from said spot.

References Cited in the file of this patent

UNITED STATES PATENTS

| Number | Name | Date |
|---|---|---|
| 1,678,884 | Sweet | July 31, 1928 |
| 2,225,485 | Rantsch | Dec. 17, 1940 |
| 2,457,113 | Alden | Dec. 28, 1948 |
| 2,485,377 | Griffin | Oct. 18, 1949 |